(12) United States Patent
Madan

(10) Patent No.: US 8,392,704 B2
(45) Date of Patent: Mar. 5, 2013

(54) INPUT/OUTPUT CONTROL AND EFFICIENCY IN AN ENCRYPTED FILE SYSTEM

(75) Inventor: Gunisha Madan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1210 days.

(21) Appl. No.: 12/189,308

(22) Filed: Aug. 11, 2008

(65) Prior Publication Data

US 2010/0037048 A1   Feb. 11, 2010

(51) Int. Cl.
*H04L 29/06* (2006.01)
*G06F 3/00* (2006.01)

(52) U.S. Cl. ......... 713/165; 713/164; 713/167; 710/52; 710/53

(58) Field of Classification Search .......... 713/164, 713/165, 166, 167; 380/36, 37; 710/52, 710/53; 711/147, 150
See application file for complete search history.

(56) References Cited

U.S. PATENT DOCUMENTS

| | | | |
|---|---|---|---|
| 6,249,866 B1 * | 6/2001 | Brundrett et al. | 713/165 |
| 6,615,349 B1 * | 9/2003 | Hair | 713/165 |
| 6,640,269 B1 | 10/2003 | Stewart | 710/52 |
| 6,721,824 B1 * | 4/2004 | Stewart | 710/52 |
| 6,963,972 B1 | 11/2005 | Chang et al. | 713/153 |
| 2002/0066022 A1 * | 5/2002 | Calder et al. | 713/200 |
| 2002/0144003 A1 | 10/2002 | Jin | 719/310 |
| 2002/0181704 A1 * | 12/2002 | Yamaguchi | 380/37 |
| 2010/0217970 A1 * | 8/2010 | Carter et al. | 713/150 |

FOREIGN PATENT DOCUMENTS

EP   1 176 507 A2   1/2002

OTHER PUBLICATIONS

PCT International Search Report for International Application No. PCT/EP2009/060009, mailed Nov. 26, 2009, 9 pages.
"A simple technique to manage sensitive data in a file," IP.com No. IPCOM000010301D, Nov. 19, 2002.
Bealkowski et al., "Adding Data Security to Asynchronous Communications," TDB Aug. 1989, pp. 129-131.
Johnson et al., "Method for Multiple Encryption using N Data Encryption Standard Keys," TDB v. 38, n. 9, Sep. 1995, pp. 133-134.

* cited by examiner

*Primary Examiner* — Tae Kim
(74) *Attorney, Agent, or Firm* — VanLeewen & VanLeewen; David A. Mims, Jr.

(57) ABSTRACT

An approach for improving input/output control and efficiency in an encrypted file system (EFS) is provided. In this approach, a software application writes data to a first buffer and then requests that an encrypted file system save the data onto a nonvolatile storage device. The encrypted file system encrypts the data and stores the encrypted data in a second buffer and then writes the encrypted data from the second buffer to the nonvolatile storage area. Meanwhile, the software application is able to resume writing additional data to the buffer after the data has been copied to the second buffer even if the data has not yet been written to the nonvolatile storage area.

14 Claims, 4 Drawing Sheets

INPUT/OUTPUT CONTROL AND EFFICIENCY IN AN ENCRYPTED FILE SYSTEM

BACKGROUND OF THE INVENTION

1. Technical Field

The present invention relates to an approach for improving the input/output control and efficiency in an encrypted file system. More particularly, the present invention provides an approach that reduces the time that an application has to wait while storing data in an encrypted file system.

2. Description of the Related Art

Encrypted file systems include "full disk encryption" (also known as "whole disk encryption") as well as filesystem-level encryption (also known as "folder encryption). As the name implies, in full disk encryption, nearly every file is encrypted including swap files and temporary files. Because nearly everything is encrypted, the user typically cannot decide which files to encrypt. On the other hand, filesystem level encryption is a form of disk encryption where individual files, directories (folders), or the file system itself are encrypted. Typically, filesystem level encryption is more flexible, especially in terms of the encryption keys used to encrypt the files and directories. Generally, file system metadata (e.g., directory structures, files names, etc.) are not encrypted with filesystem level encryption, while this metadata is traditionally encrypted under full disk encryption. Regardless of the particular type of encrypted file system, encrypted file systems are challenged in terms of input/output control as well as efficiency.

Encrypted file systems employ encryption algorithms to encrypt unencrypted data into an encrypted format before storing the encrypted data onto a nonvolatile storage device, such as a hard drive. Encrypting data into an encrypted format and then writing the encrypted data to the nonvolatile storage device is relatively time consuming. One challenge is that the software application waits for the encrypted file system to encrypt and store data before proceeding. This results in decreased efficiency in terms of both the encrypted file system as well as the software applications running in a system that uses an encrypted file system.

SUMMARY

It has been discovered that the aforementioned challenges are resolved using an approach where a software application writes data to a first buffer and then requests that an encrypted file system save the data onto a nonvolatile storage device. The encrypted file system encrypts the data and stores the encrypted data in a second buffer and then writes the encrypted data from the second buffer to the nonvolatile storage area. Meanwhile, the software application is able to resume writing additional data to the buffer after the data has been copied to the second buffer even if the data has not yet been written to the nonvolatile storage area.

writing, by the software application, a second set of data to the first buffer, wherein the second set of data is written to the first buffer before the encrypted file system has completed writing the first set of encrypted data to the nonvolatile storage area.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
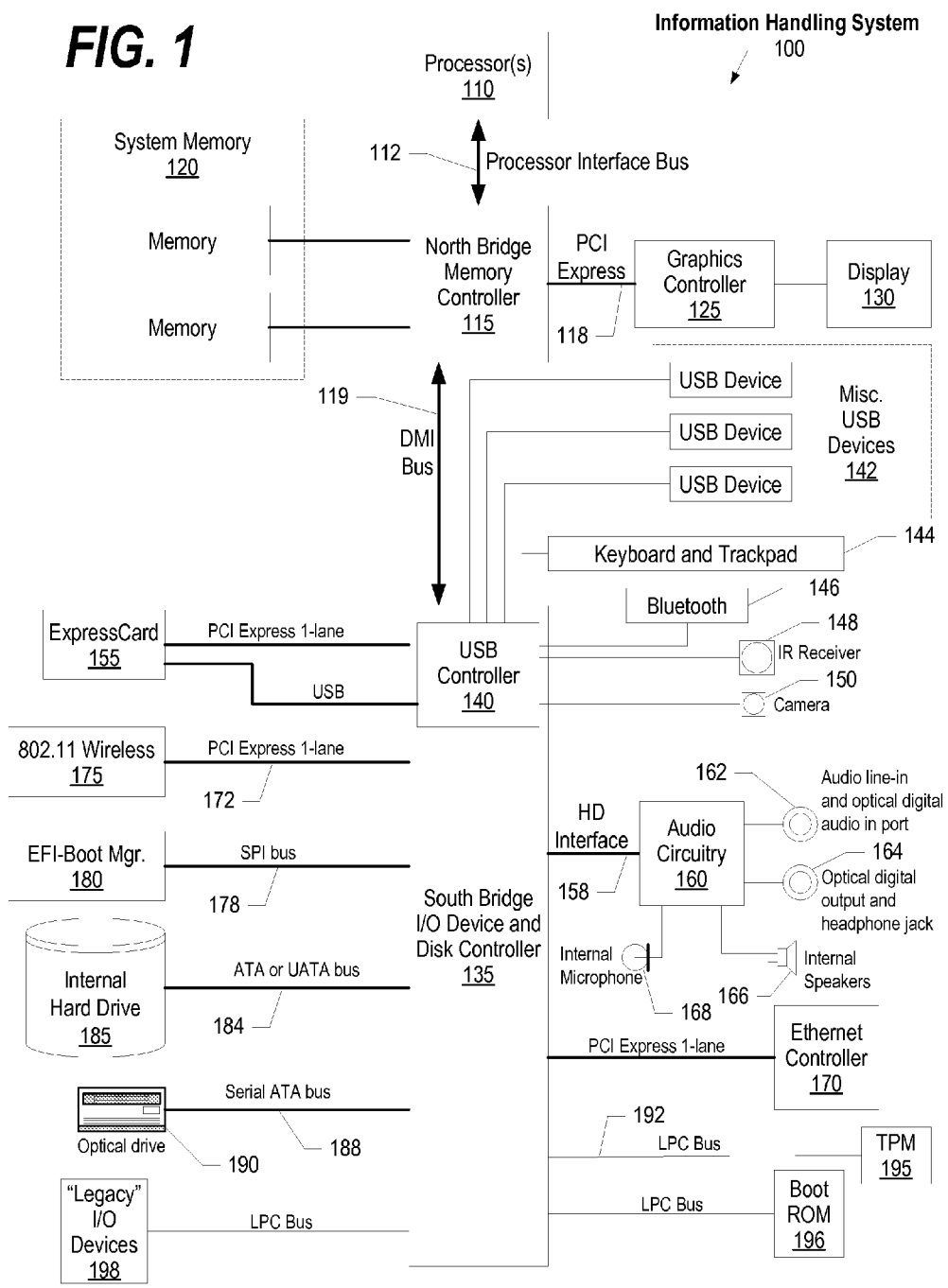
FIG. 1 is a block diagram of a data processing system in which the methods described herein can be implemented.
Figure 2:
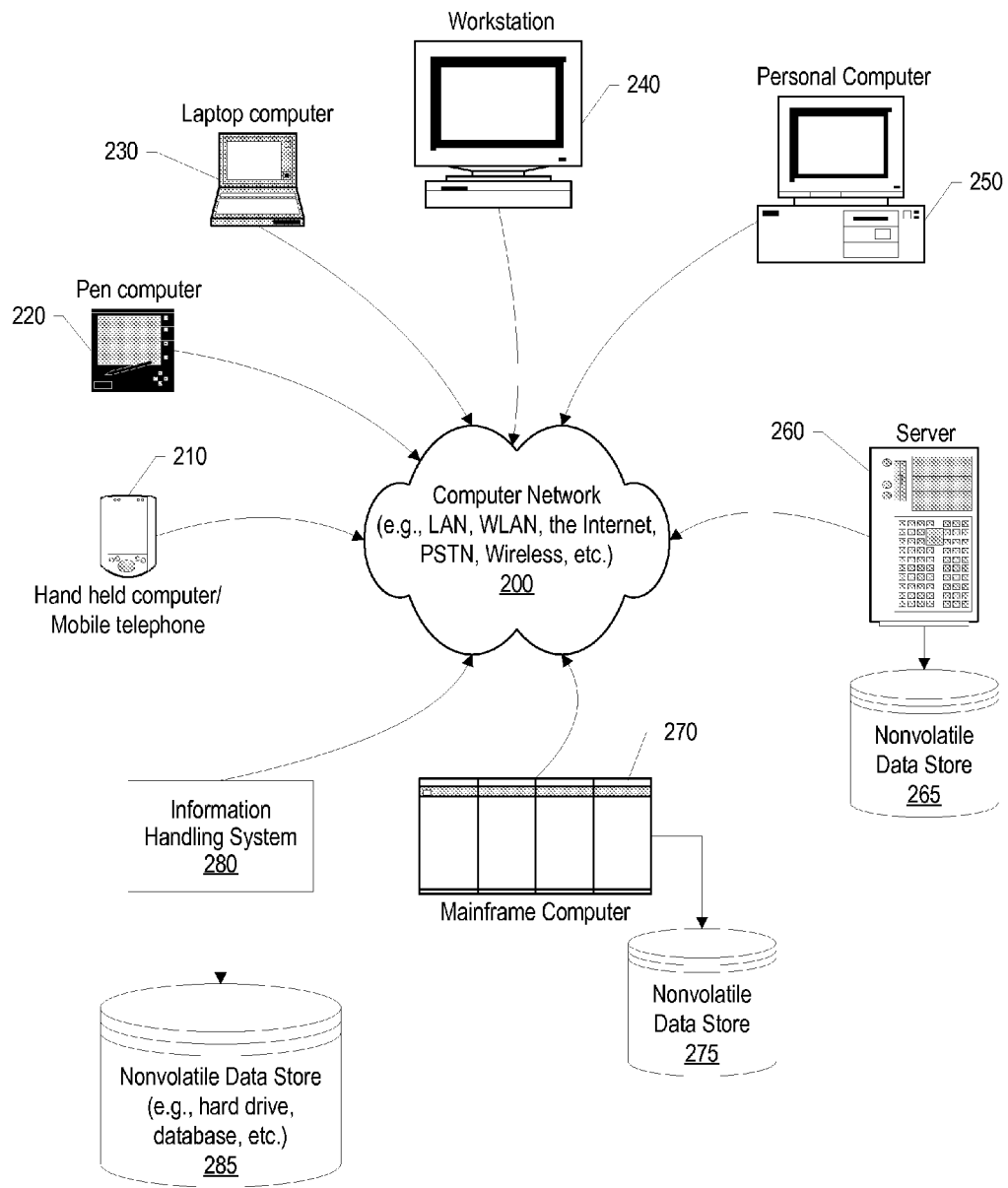
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 300 such as a hybrid hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc. Removable storage device 145 can also be a hybrid disk drive, such as hybrid disk drive 300 shown in FIGS. 3-6.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
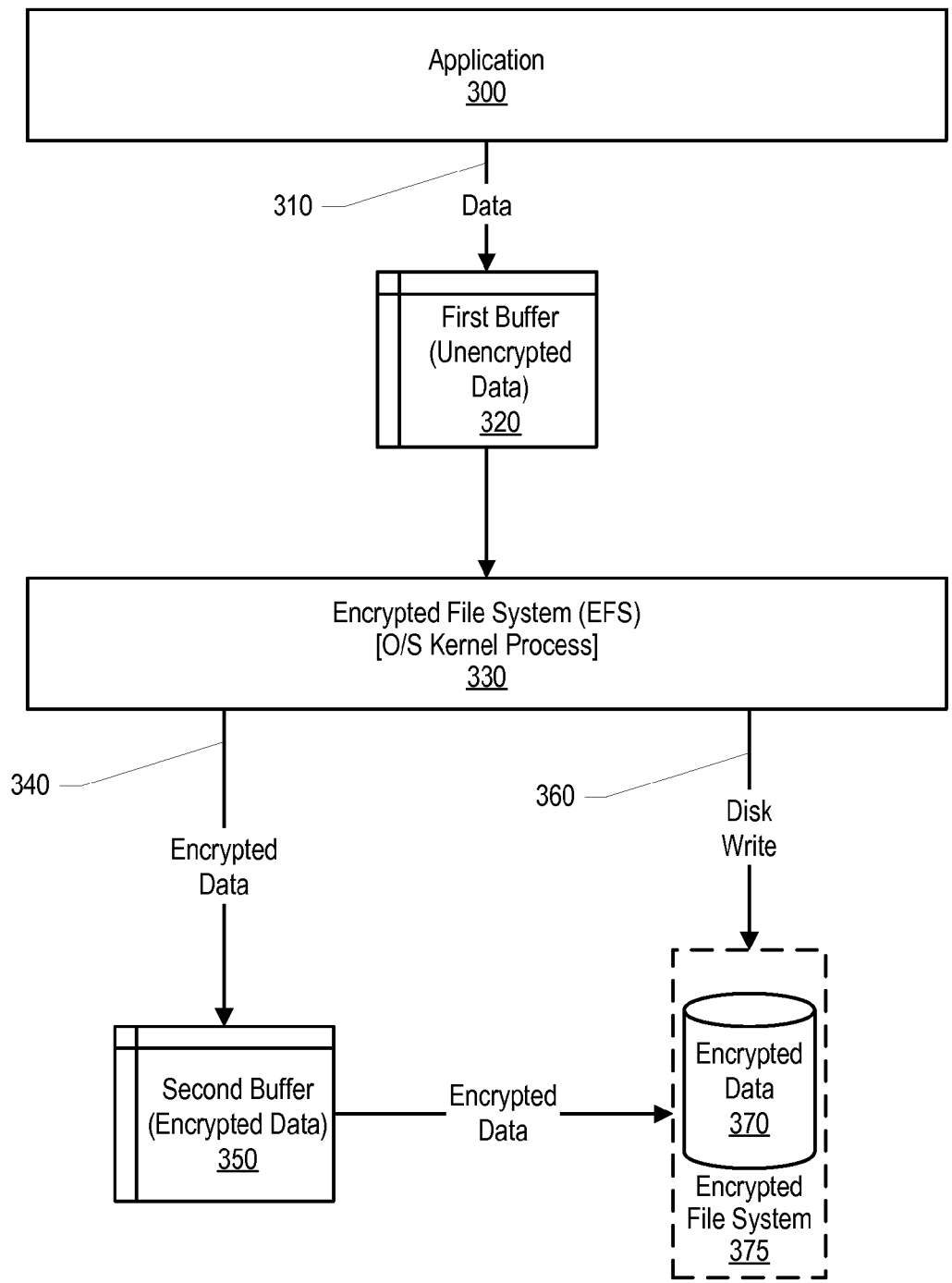
FIG. 3 is a diagram of the interface between an application and an encrypted file system in order to securely save the application's data in the encrypted file system.

FIG. 3 is a diagram of the interface between an application and an encrypted file system in order to securely save the application's data in the encrypted file system. Application 300 writes data 310 to first buffer 320. As shown, first buffer is used to store unencrypted data used by or generated by application 300. At some point, such as when buffer 320 becomes full, a request is made to encrypted file system process 330 to write the data to the encrypted file system 375. In one embodiment, the encrypted file system process is a kernel process that runs within a kernel of an operating system.

Encrypted file system process 330 reads the data from first buffer 320 and writes encrypted data 340 to second buffer 350. In one embodiment, data is read from first buffer 320, encrypted, and the resulting encrypted data 340 is stored in second buffer 350. In an alternate embodiment, data is read from first buffer 320 and written to second buffer 350 and then encrypted in place in the second buffer. After encrypted data 340 has been created and stored in second buffer 350 (e.g., using one of the embodiments described above), then encrypted file system process 330 performs disk write 360 which results in the encrypted data being read from second buffer 350 and stored in nonvolatile data store 370 which is part of the encrypted file system.

Application 300 is allowed to write additional data to first buffer 320 after the data has been read from first buffer 320 by encrypted file system process 330. In one embodiment, the encrypted file system process locks first buffer 320 upon receiving the request from application 300. When encrypted file system process 330 is finished reading the data, it unlocks first buffer 320 so that application 300 can resume writing data to the first buffer. In this manner, application 300 can resume writing data to first buffer 300 before all of the encrypted data stored in second buffer 350 has been written to encrypted data store 370.

Figure 4:
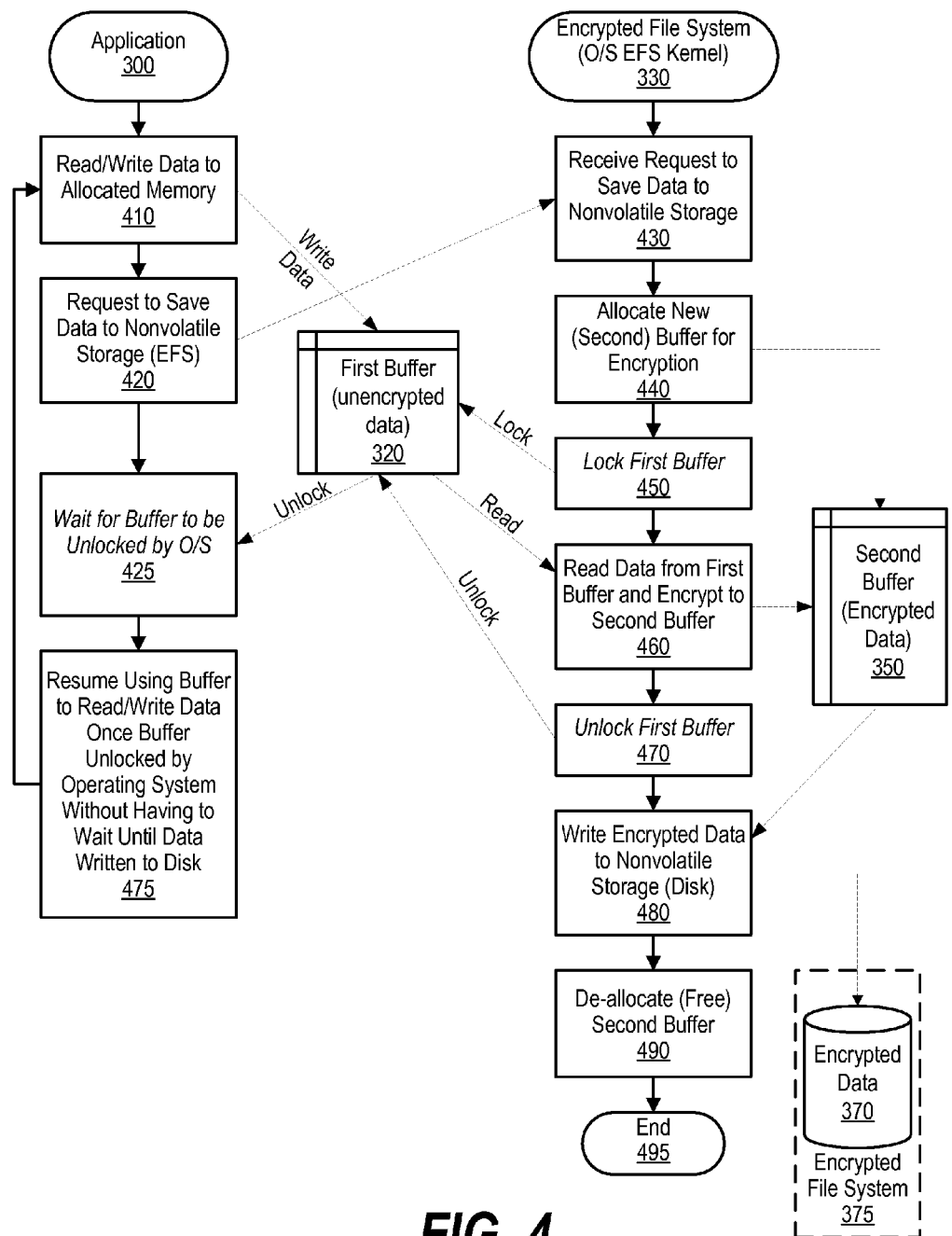
FIG. 4 is a flowchart showing the application saving its data using the encrypted file system so that the application does not have to wait to write new data while the encrypted file system is busy encrypting data.

FIG. 4 is a flowchart showing the application saving its data using the encrypted file system so that the application does not have to wait to write new data while the encrypted file system is busy encrypting data. The software application's processing commences at 300 whereupon, at step 410, the software applications writes unencrypted data to first buffer 320 which is stored in the memory of the information handling system where the software application is running. At some point (e.g., when first buffer 320 is full or nearly full, etc.) a request is made to save the data that has been written to the buffer to the nonvolatile storage managed by the encrypted file system (step 420). In one embodiment, the request includes a pointer or address of first buffer 320 as well as any file characteristics (e.g., filename, file location, directory, etc.) where the data is to be stored in the encrypted file system. At step 425, the software application waits to write additional data to first buffer 320 until the first buffer is unlocked by the encrypted file system process.

Encrypted file system processing (e.g., performed by an operating system kernel process) is shown commencing at 330 whereupon, at step 430, the encrypted file system process receives the request to save data to nonvolatile storage. At step 440, the encrypted file system either allocates or uses an existing second buffer that will be used to store the encrypted data. At step 450, while the encrypted file system process is reading the data from first buffer 320, the first buffer is locked so that the software application (or other software applications) will not be able to write data to the buffer while the encrypted file system process is reading the data. In a first embodiment, at step 460, the unencrypted data is read from first buffer 320, encrypted by the encrypted file system process, and the encrypted data is stored in second buffer 350. In a second embodiment, at step 460, the unencrypted data is read from first buffer 320, written to second buffer 350, and encrypted in place. While in a third embodiment, at step 460, the unencrypted data is read from first buffer 320, written to another buffer (a third buffer), and then the data in the third buffer is read and encrypted and the resulting encrypted data is stored in second buffer 350. In any case, at step 470, the encrypted file system process unlocks the first buffer after all of the data has been read from the first buffer. Using the first embodiment, the first buffer is unlocked once all of the data is read from first buffer 320 and the resulting encrypted data is written to second buffer 350. Taking the second embodiment, the first buffer is unlocked when all of the unencrypted data has been read from first buffer 320 and written to second buffer 350 (i.e., before the encryption in-place has taken been performed). Finally, using the third embodiment, the first buffer is unlocked when all of the unencrypted data has been read from first buffer 320 and written to a "third" buffer (before the data is encrypted and saved to second buffer 350).

When first buffer 320 is unlocked, the software application is notified and, at step 475, the software application can resume using first buffer 320 to read and write data without having to wait for the resulting encrypted data to actually be written to nonvolatile storage. Taking place at the same time as step 475, the encrypted file system process, at step 480, writes the encrypted data stored in second buffer 350 to nonvolatile storage 370 that is managed by the encrypted file system. As mentioned above, while the encrypted file system process is writing the encrypted data to data store 370, the software application is free to resume writing data to first buffer 320 for eventual writing to the nonvolatile storage managed by the encrypted file system. At step 490, after the encrypted data has been written to the nonvolatile storage, the second buffer is de-allocated (freed) in order to free the memory used to store the second buffer. Encrypted file system processing ends at 495 until the encrypted file system is requested by a software application to read or write more data to a nonvolatile storage area that is managed by the encrypted file system.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    writing, by a software application executing on at least one of a plurality of processors, a first set of data to a first buffer;
    requesting that an encrypted file system save the data stored in the first buffer, the encrypted file system executing on at least one of the plurality of processors;
    locking the first buffer after the requesting so that additional data is not written to the first buffer until the first buffer is unlocked;
    encrypting, by the encrypted file system, the first set of data resulting in a first set of encrypted data, wherein the first set of encrypted data is stored in a second buffer;
    writing, by the encrypted file system, the first set of encrypted data from the second buffer to a nonvolatile storage area;
    unlocking the first buffer, wherein the unlocking is performed after the encrypting but before all of the first set of encrypted data has been written from the second buffer to the nonvolatile storage area; and
    writing, by the software application, a second set of data to the first buffer, wherein the second set of data is written to the first buffer before the encrypted file system has completed writing the first set of encrypted data from the second buffer to the nonvolatile storage area, and wherein the software application waits to write the second set of data to the first buffer until the first buffer is unlocked.

2. The method of claim 1 wherein an operating system kernel process performs the encrypting and the writing of the first set of encrypted data to the nonvolatile storage area.

3. The method of claim 1 further comprising:
    prior to writing the first set of data to the first buffer, allocating the first buffer so that the first buffer is owned by the software application, wherein the requesting includes sending an address of the first buffer to the encrypted file system; and
    wherein locking the first buffer further comprises locking, by the encrypted file system, the first buffer after receiving the request from the software application, wherein the locking prevents any software application running in a computer system, including the software application, from writing data to the first buffer.

4. The method of claim 3 further comprising:
    allocating, by the encrypted file system, the second buffer prior to performing the encrypting;
    reading the first set of data from the first buffer;
    writing the first set of data to the second buffer;
    wherein unlocking the first buffer further comprises unlocking the first buffer after the first set of data has been written to the second buffer; and
    encrypting the data written to the second buffer in place resulting in the first set of encrypted data being stored in the second buffer.

5. The method of claim 4 further comprising:
    receiving, at the software application, a notification that the first buffer has been unlocked; and
    wherein writing, by the software application, the second set of data to the first buffer further comprises writing the second set of data to the first buffer before the encryption of the first set of data has been completed by the encrypted file system.

6. An information handling system comprising:
    one or more processors;
    a memory accessible by at least one of the processors;
    a nonvolatile storage device accessible by one or more of the processors;
    an operating system executed by the processors, wherein the operating system includes an encrypted file system that stores encrypted data in the nonvolatile storage device;
    a software application managed by the operating system and executed by one or more of the processors; and
    a set of instructions which are loaded into memory and executed by at least one of the processors in order to perform actions of:
        writing, by the software application, a first set of data to a first buffer stored in the memory;
        requesting that the encrypted file system save the data stored in the first buffer;
        locking the first buffer after the requesting so that additional data is not written to the first buffer until the first buffer is unlocked;
        encrypting, by the encrypted file system, the first set of data resulting in a first set of encrypted data, wherein the first set of encrypted data is stored in a second buffer that is stored in the memory;
        writing, by the encrypted file system, the first set of encrypted data from the second buffer to the nonvolatile storage device;
        unlocking the first buffer, wherein the unlocking is performed after the encrypting but before all of the first set of encrypted data has been written from the second buffer to the nonvolatile storage area; and
        writing, by the software application, a second set of data to the first buffer, wherein the second set of data is written to the first buffer before the encrypted file system has completed writing the first set of encrypted data from the second buffer to the nonvolatile storage area, and wherein the software application waits to write the second set of data to the first buffer until the first buffer is unlocked.

7. The information handling system of claim 6 wherein the instructions executed by at least one of the processors perform additional actions comprising:
    prior to writing the first set of data to the first buffer, allocating the first buffer in the memory so that the first buffer is owned by the software application, wherein the requesting includes sending an address of the first buffer to the encrypted file system; and
    wherein locking the first buffer further comprises locking, by the encrypted file system, the first buffer after receiving the request from the software application, wherein the locking prevents any software application running in the operating system, including the software application, from writing data to the first buffer.

8. The information handling system of claim 7 wherein the instructions executed by at least one of the processors perform additional actions comprising:
- allocating, by the encrypted file system, the second buffer prior to performing the encrypting;
- reading the first set of data from the first buffer;
- writing the first set of data to the second buffer;
- wherein unlocking the first buffer further comprises unlocking the first buffer after the first set of data has been written to the second buffer; and
- encrypting the data written to the second buffer in place resulting in the first set of encrypted data being stored in the second buffer.

9. The information handling system of claim 8 wherein the instructions executed by at least one of the processors perform additional actions comprising:
- receiving, at the software application, a notification that the first buffer has been unlocked; and
- wherein writing, by the software application, the second set of data to the first buffer further comprises writing the second set of data to the first buffer before the encryption of the first set of data has been completed by the encrypted file system.

10. A computer program product stored in a non-transitory computer readable storage medium, comprising functional descriptive material that, when executed by an information handling system, causes the information handling system to perform actions that include:
- writing, by a software application, a first set of data to a first buffer;
- requesting that an encrypted file system save the data stored in the first buffer;
- locking the first buffer after the requesting so that additional data is not written to the first buffer until the first buffer is unlocked;
- encrypting, by the encrypted file system, the first set of data resulting in a first set of encrypted data, wherein the first set of encrypted data is stored in a second buffer;
- writing, by the encrypted file system, the first set of encrypted data from the second buffer to a nonvolatile storage area;
- unlocking the first buffer, wherein the unlocking is performed after the encrypting but before all of the first set of encrypted data has been written from the second buffer to the nonvolatile storage area; and
- writing, by the software application, a second set of data to the first buffer, wherein the second set of data is written to the first buffer before the encrypted file system has completed writing the first set of encrypted data from the second buffer to the nonvolatile storage area, and wherein the software application waits to write the second set of data to the first buffer until the first buffer is unlocked.

11. The computer program product of claim 10 wherein an operating system kernel process performs the encrypting and the writing of the first set of encrypted data to the nonvolatile storage area.

12. The computer program product of claim 10 further comprising functional descriptive material that causes the information handling system to perform additional actions that include:
- prior to writing the first set of data to the first buffer, allocating the first buffer so that the first buffer is owned by the software application, wherein the requesting includes sending an address of the first buffer to the encrypted file system; and
- wherein locking the first buffer further comprises locking, by the encrypted file system, the first buffer after receiving the request from the software application, wherein the locking prevents any software application running in a computer system, including the software application, from writing data to the first buffer.

13. The computer program product of claim 12 further comprising functional descriptive material that causes the information handling system to perform additional actions that include:
- allocating, by the encrypted file system, the second buffer prior to performing the encrypting;
- reading the first set of data from the first buffer;
- writing the first set of data to the second buffer;
- wherein unlocking the first buffer further comprises unlocking the first buffer after the first set of data has been written to the second buffer; and
- encrypting the data written to the second buffer in place resulting in the first set of encrypted data being stored in the second buffer.

14. The computer program product of claim 13 further comprising functional descriptive material that causes the information handling system to perform additional actions that include:
- receiving, at the software application, a notification that the first buffer has been unlocked; and
- wherein writing, by the software application, the second set of data to the first buffer further comprises writing the second set of data to the first buffer before the encryption of the first set of data has been completed by the encrypted file system.

* * * * *